United States Patent [19]
Hunt

[11] Patent Number: 5,883,182
[45] Date of Patent: *Mar. 16, 1999

[54] COATING COMPOSITIONS AND COATINGS THEREOF

[75] Inventor: James R. Hunt, Tucker, Ga.

[73] Assignee: A Creative Research & Testing Co., Lawrenceville, Ga.

[*] Notice: This patent issued on a continued prosecution application filed under 37 CFR 1.53(d), and is subject to the twenty year patent term provisions of 35 U.S.C. 154(a)(2).

[21] Appl. No.: 779,360

[22] Filed: Jan. 6, 1997

[51] Int. Cl.$^6$ ....................................................... C08L 31/04
[52] U.S. Cl. ............................................................ 524/525
[58] Field of Search ................................................ 524/525

[56] References Cited

U.S. PATENT DOCUMENTS 4,271,213  6/1981  Grimm et al. ........................... 427/222

*Primary Examiner*—Edward J. Cain

[57] ABSTRACT

There is provided an aqueous coating composition which contains about 2 to 60% by weight of non-carbonized desulphurized rubber crumb having a mesh size of about 2 to 100. The composition contains about 20 to 60% of a binder and other optional ingredients. The coating composition is particularly useful as a roof mastic.

13 Claims, No Drawings

COATING COMPOSITIONS AND COATINGS THEREOF

FIELD OF THE INVENTION

The present invention relates to novel coating compositions containing crumb rubber and coatings thereof. More particularly, there is provided rubber crumb containing coating compositions which are useful in forming elastomeric roof mastics, ground coatings, moisture barriers for parts and installations, and the like.

BACKGROUND OF THE INVENTION

Coatings which protect roofing substrates that are based on specifically designed elastomeric polymers are referred to as roof mastics. These coatings to be effective should be able to pass the tests for (1) water ponding (2) water vapor transmission (3) cold temperature flex (4) flame retardancy and (5) reflectance.

Coatings which are corrosion resistant and can adhere to a large variety of substrates including rubber, foam, metal and the like are useful for many applications depending on the type of binder or fillers that are used.

Having a basic coating composition with good mechanical and chemical properties will reduce the cost of manufacture and market price of the products. The compositions would be environmentally advantages if there can be used recycled waste material. Disposal of used tires has become an environmental problem. The reclamation of tires for other uses would be helpful in solving some of the environmental problems.

U.S. Pat. No. 5,362,759 to Hunt et al, which is herein incorporated by reference, discloses rubber crumb obtained by heat treating used rubber under reduced pressure with microwave energy. The rubber crumb of this patent is particularly useful in the present invention. According to the method taught in Hunt et al., the curd rubber is stirred while being simultaneously subjected to microwave energy, as a result, uniform heating is carried out throughout the charge to desulfurize the rubber and to vaporize any process oil entrapped in the rubber. The vulcanized rubber is heated by microwave to a temperature of about 50° to 100° C., preferably about 78° C. The heating time is generally about 15 minutes. The temperature is controlled by a temperature sensor and automatically controls the operation of the microwave vacuum reactor cell. The vapors emanating from the process oil entrapped in the rubber and the gases generated by the desulfurization reaction are vented through the vapor outlet means.

SUMMARY OF THE INVENTION

The present invention provides a coating composition which comprises:
a) about 2 to 60% by weight of rubber crumb having a size of about 8 to 100 mesh, preferably about 2 to 10% of rubber crumb;
b) about 2 to 40% by weight of a binder;
c) water, and optionally,
d) thickeners, fillers, pigments and surfactants.

Advantageously, the rubber crumb utilized in the present invention is not carbonized and is desulphurized.

It is a general object of the present invention to provide a coating composition which contains as its essential ingredient rubber crumb.

It is a further object of the invention to provide an elastomeric roof mastic containing rubber crumb.

It is another object of the invention to provide coating for parts and installations which contains rubber crumb.

Other objects and a fuller understanding of the invention will be had by referring to the following description and claims of a preferred embodiment.

DESCRIPTION OF THE PREFERRED EMBODIMENTS

Although specific terms are used in the following description for the sake of clarity, these terms are intended to refer only to the particular feature of the invention for illustration and are not intended to define or limit the scope of the invention.

In accordance with the present invention, there is provided a coating composition for coating roofs, parts, installations, automobiles and the like. The composition about 2 to 60% by weight of rubber crumb having a mesh size of about 2 to 100. Preferably, about 2 to 10% of rubber crumb is utilized in the composition. The rubber crumb advantageously has been desulfurized and is non-carbonized. Non-carbonized rubber crumb provides the composition and coating therefrom with good adhesion on a wide variety of substrates. The composition also contains about 20 to 60% by weight of a binder and water.

A preferred composition of the present invention which can be used for forming roof mastics comprises:
about 25 to 45% by weight of an acrylic latex, preferably about 30 to 40% by weight;
about 5 to 20% by weight of rubber crumb, said rubber crumb being non-carbonized and desulfurized and having a mesh size of about 8 to 100;
about 5 to 20% by weight of water;
about 5 to 20% by weight of an inorganic filler; and
about 0.1 to 4% by weight of a surfactant.

Depending upon the utility of the coating, there may be added fillers, thickeners and/or other materials which are conventionally utilized in coating compositions.

In addition to the aforesaid essential ingredients, other components such as disclosed hereinafter can be included in the composition, as desired, and so long as they do not interfere with the curing process. Thus, for example, it may be desirable for a particular application, to include in the composition one or more of the following components: a wetting agent, a plasticizer, a leveling agent, a thixotropic agent, a flame retardant, an adhesion promoter, a stabilizer, or an inhibitor, all of which are commonly used in the formulation of coating compositions and inks, to afford certain desired physical properties thereto. To further illustrate the various other additives that may be incorporated in the composition of the invention, the following is given:

Wetting agents: Examples of various wetting agents that can be used in the invention are: polyethylene glycol fatty esters, nonyl phenol ethylene oxide, fluorinated hydrocarbons, 2,2,3,3 tetrafluoroproprylmethacrylate and acrylate, fluorinated alkyl polyoxyethylene ethanol, polypropoxy quaternary ammonium acetate, polymethylsiloxane, and ammonium salt of sulfated nonylphenoxypoly (ethyleneoxy) ethanol. The preferred wetting agents are fluorinated hydrocarbons. Fc-430 is the fluorinated hydrocarbon used herein that is soluble in the composition and, likewise, lowers the composition's surface tension.

Plasticizer: Examples of various plasticizer that can be used in the invention are: adipates, azelates, benzoates, epoxidized linseed oil, hydrocarbons, phosphates, polyesters, phthalates, trimellitates, aliphatic siloxanes, nonionic (polyethylene oxides), anionic (sodium lauryl sulfates), and cationic (cetyl pyridinium chloride). Those skilled in the art of formulating coating compositions will be able to select that particular plasticizer most suitable in any particular application. It will be appreciated, as earlier suggested, that use of such a component in any specific case is entirely optional and will depend upon the desired flexibility in the cured coating. For example, it may be desirable to include a plasticizer in a coating composition containing an epoxy acrylate resin, as such compositions, in general, will be found, on curing, to be relatively rigid.

Leveling Agents: Examples of various leveling agents that can be used in the invention are: sucrose benzoate, copolymer 2-ethylhexyl acrylate and ethyl acrylate, calcium stearate, and nonionic surface active agents.

Adhesion Promoters: Examples of various adhesion promoters that can be used in the invention are: dimethylaminoethyl acrylate and methacrylate, diethlaminoethyl acrylate and methacrylate, silanes, titanates, allyl ether of cyclic ureido, zircoaluminate, lignocellulosic, and thiodigylcol diacrylates and methacrylates. In some instances, where greater adhesion is required with a particular substrate coated, the adhesion will be obtained by first heating the substrate, and then applying the coating composition.

The binders which can be used in accordance with the invention are dependent upon the type of coating. Thermoplastic or thermoset resins can be utilized.

Thermoplastic resins, for example, may include polyethylene, ethylenevinyl acetate copolymers, polypropylene, polystyrene, polyvinyl chloride, polyvinyl acetate, polymethacrylate, acrylonitrile-butadiene-styrene copolymers (ABS), polyphenylene oxide (PPO), modified PPO, polycarbonate, polyacetal, polyamide, polysulfone, polyether sulfone, polyolefins, polyacrylonitrile, polyvinylidene chloride, polyvinyl acetate, polyvinyl alcohol, polyvinyl pyrrolidone, ethyl cellulose, polyvinyl chloridevinyl acetate copolymer, polyacrylonitrile-styrene copolymer, polyacrylonitrile-vinyl chloride copolymer, carboxymethylcellulose, etc., polyparaxylene, polyimide, polyamide-imide, polyester imide, polybenzimidazole, polyoxadiazole, and the like.

Thermoset polymers are art-recognized and are extensively crosslinked polymers which do not significantly soften upon heating. Typically thermoset polymers are cured causing crosslinking forming a final coated product. The curing may be any type of curing which causes crosslinking including radiation, e.g., electron beam, catalyst, humidity or air curing. Thermoset polymer systems may include a polymer and/or prepolymer. The systems also may include additional agents which enhance the crosslinking process. Examples of thermoset polymers include the following:

phenol-formaldehyde
melamine-formaldehyde
urea-formaldehyde
polyurethane
unsaturated polyester
epoxy
phenolic anilin
furan
polyester
polyurethane
polyphenylene sulfide
polyimide
silicone
poly-p-phenylene benzobisthiazole
polyacrylate
polymethacrylate
novolac
phenolic
alkyd Other suitable resinous materials are disclosed in *Modern Plastics Encyclopedia*, 1984–85, Vol. 61, No. 10A, McGraw-Hill, New York, N.Y., which is herewith incorporated by reference.

The compositions disclosed herein include at least one surface active agent. Surface active agents are art-recognized components. The total amount of surface active agent(s) are preferably added to the composition in amounts ranging from about 0.5 and about 4% by weight of the composition. Such agents include various of those components that are variously referred to in the art as surfactants, dispersants or dispersing agents, emulsifiers, suspension agents and solubizers.

In some cases, the use of more than one surface active agents is preferred for best results. Silane, for example, does not, alone, provide maximum loading of fillers having a negative charge. Such fillers, e.g., calcium metasilicate (wollastonkup), disperse only to a certain loading, e.g, about 42% by weight of the composition, or 52% volume of filler, and above that loading, the filler tends to agglomerate. Nevertheless, when a different surface active agent or a second surface active agent, e.g., phosphate acid ester (such as GAFAC, RE-610), is added to the composition, the filler particles then disperse from one another, with attendant reduction in viscosity.

The surface active agent to be used can, if desired, be used to coat the filler particles prior to their introduction in the composition. Such a pretreatment of fillers is known, and silane treated fillers are available commercially. Moreover, where two surface active agents are desired in the composition, to obtain maximum loading and polymer properties, the use of a surface active agent coated filler will be found most advantageous.

Examples of surface active agents that can be used in the invention are:

fish oil (one or more of oleic, palmitic and stearic acid)
anionic polyelectrolyte
linoleic acid
oleic acid
palmitic acid
stearic acid
carboxylic acid
oleyl acids
stearoyl sarcosine
sodium salt of polycarboxyl
anionic/nonionic surfactant blend
fatty alcohol ethoxylates
organic phosphate ester acid A preferred surface active agent is the quaternary ammonium salt Emco, CC-42. This surface active agent whose pH is neutral or slightly basic gives good dispersion with carbon black (Monarch 1,000) whose pH is 2.5 when introduced into the composition. Also, the quaternary ammonium salt gives good dispersion in systems whose filler is a metal and slightly acidic, i.e., electrolytic copper, and nickel. Equally goods results are achieved when the metal or metal oxide is neutral. Neutral metals such as copper, silver, palladium, gold, tungsten, platinum, etc. are dispersed in the quaternary ammonium salt.

Other quaternary ammonium salts which are equally useful as dispersants are Emco: CC-9, CC-55, and the low molecular weight quaternary ammonium salts of methacrylic (acrylic) functionality, such as: BM-604, 2-trimethylammonium ethylmethacrylate chloride, or phosphate, or acetates; BM-613, N-trimethylammonium propylmethacrylamide chloride, or phosphates, or acetates; and BM-607, 2-trimethylammoniumethyl acrylate chloride, or phosphates, or acetates.

Stabilizers: Examples of various stabilizers that can be used in the invention are: 2-hydroxy-4-alkoxy benzophenones, 2(2 hydroxy phenyl) benzotriazole, salicylates, resorcinol monobenzoates, aryl or alkyl hydroxy benzoates, substituted oxanilides, substituted formamidine, 2,2 thiobis (4-octylphenolato)-n-butylamine nickel II, nickel salts of thiocarbamate, alkylated phenol phosphonate nickel, and tetramethyl pyperidine. Such compounds will be used as necessary to increase the pot life of the coating or ink composition.

Inhibitors: Examples of various inhibitors that can be used in the invention are: hydroquinone, p-methoxyphenol, alkyl and aryl-substituted hydroquinones and quinones, tert-butyl catechol, pyrogallol, octadecyl-B-(hydroxy-3,5-di-t-butyl phenyl)-propionate, 2,6-di-tert-butyl-4-methyl phenol, phosphorous acid, beta-naphthol, 2,6-di-tert-butyl p-cresol, 2,2-methylene bis(4-ethyl-6-t-butylphenol), p-toluquinone, aryl and alkyl phosphites, and benzotriazoles. Addition of such components to the compositions of this invention will increase the shelf life, as desired.

Those skilled in the art of formulating coating compositions can readily determine the amounts of such optional additives, to be added to any particular composition of our invention, for any particular application and desired property. Such materials are, in general, present in the compositions in very minor concentrations, ranging from less than 5% by weight of the polymer composition, and usually less than 3% by weight of the polymer compositions. In any event, such additives are not included in any significant amount whereby the additives do not interfere with the cross-linking of the polymeric material or to lessen the good properties desired, and achieved, in the cured coating.

The coating compositions can contain inert solvents, surfactants, flow and leveling agents, slip agents, thickeners, pigments, fillers, plasticizer, and other additives which are known to those skilled in the art of formulating coatings which can be used in conventional amounts. The amount of such components used is dependent on the desired viscosity and other flow characteristics and known to the skilled artisan.

Some of the suitable inorganic fillers include calcium carbonate, calcium silicate, titanium oxide, aluminum oxide, talc, clay, alumina, calcium hydroxide, magnesium carbonate, fumed silica, and the like.

Some of the organic fillers which may be used include powdered Teflon, melamine, melamine formaldehyde, carbon, black, and the like.

Examples of various flame retardant that can be used are tetrabromo disphenol, A-diacrylate, methyl pentachlorostearate, bis (tribromo-phenoloxy) ethane, aluminum trihydrate, antimony oxide, phosphates, zinc borates and barium metaborates.

The coating compositions of the invention can be formulated for a large variety of uses in addition to elastomeric roof mastics. Depending upon the ultimate use, the compositions can be formulated using different binders and fillers to prepare sound dampening products, moisture barriers, floor and asphlate coatings, foam coatings, tennis court coatings, automotive coatings, pool and shower barriers, and the like.

The presence of the rubber crumb not only gives the final coating good flexibility, but improves the adhesion to rubber, asphalt and specifically polyurethane foam. The rubber crumb allows the water to quickly escape so as to provide a quick set.

The following examples further illustrate the present invention.

EXAMPLE I

A roof mastic was prepared as follows:

Step A.

The following ingredients were admixed in a stainless steel vat with a high speed Banbury mixer.

| Ingredient | lbs /gal |
| --- | --- |
| Water | 111.7 |
| Acrylic latex binder | 114.3 |
| Ethylene glycol | 25.0 |
| Carboxy cellulose | 3.4 |
| Non-silicone defoamer | 3.8 |
| Surfactant (KTPP) | 1.5 |
| Zinc oxide | 57.1 |
| Titanium dioxide | 85.1 |
| Crumb rubber (8–100 mesh) | 550.0 |

The mixture was mixed at high speed for 15 minutes.

Step B.

To the composition of Step A was added with mixing the following mixture of ingredients.

| Ingredient | lbs/gal |
| --- | --- |
| Acrylic latex binder | 322.0 |
| Surfactant | 8.0 |
| Mildewade | 2.0 |
| Ammonium hydroxide | 6.5 |

The above composition can be sprayed, painted and rolled onto an existing roof structure and applied as one or more layers as required. If desired additional fire retardancy compositions (about 2–5%) may be added into the composition in either the composition of Step A or B.

EXAMPLE II

A comparative study was performed with the composition of Example I and two commercially available roof mastic compositions. The results are as follows:

|  | Composition of Example I | Rohm & Haas | Union Carbide |
| --- | --- | --- | --- |
| Elongation | 276 | 272 | 263 |
| Tensile Strength | 292 | 160 | 288 |
| Ponded Water Resistance (grms/24 hrs) | 0.0162 | 0.0668 | 0.0165 |
| Cold Temperature Flex (−25° F.) | Pass | Pass | Pass |
| Weight per gallon | 13.10 | 13.11 | 13.08 |
| Flame Retardant | Pass | Fail | Fail |
| Water Vapor Transmission | 0.22 | 0.32 | 0.23 |
| R Value | 8.6 per/inch | 2.4 per/inch | 1.8 per/inch |

Flame retardancy was evaluated in accordance with Underwriters Laboratories, Inc. Standard 790 "Tests for Fire Resistance of Roof Covering Materials" (ASTM E-108).

Water vapor transmission was evaluated pursuant to the "Water Method" of ASTM E96-80 (3.2, 12.4).

Reflectance quality was tested under actual exposure conditions of asphalt roofs covered with the roof mastic compositions. The composition of the invention showed a reduction in surface temperature and a corresponding decrease in the temperature within the structure by as much as 28° F.–30° F.

What is claimed is:

1. A coating composition which comprises an admixture of:
   a) about 2 to 60% by weight of a non-coated rubber crumb derived from used tires and having a mesh size of about 2 to 100, said rubber crumb having substantially all essential oils removed and being non-carbonized and desulphurized;
   b) about 20 to 60% by weight of a binder; and
   c) water;
   whereby a coating is formed with said composition at ambient temperature.

2. The coating composition of claim 1 including fillers and thickening agents.

3. The coating composition of claim 1 including a pigment.

4. The coating composition of claim 1 including a surfactant.

5. The coating composition of claim 1 wherein said binder is selected from the group consisting of acrylic, polyester and epoxy.

6. The coating composition of claim 6 wherein said binder is an acrylic latex.

7. A coating composition for use a roof mastic which comprises an admixture of:
   about 25 to 45% by weight of an acrylic latex;
   about 5 to 20% by weight of a non-coated rubber crumb having a mesh size of about 8 to 100;
   said rubber crumb being derived from used tires and having substantially all essential oils removed and being non-carbonized and desulfurized;
   about 5 to 20% by weight of water;
   about 5 to 20% by weight of an inorganic filler; and
   about 0.1 to 4% by weight of surfactant;
   whereby a coating is formed with said composition at ambient temperature.

8. The coating composition of claim 7 including a flame retardant.

9. The coating composition of claim 8 wherein said filler comprises a metal oxide.

10. A coating prepared by the composition of claim 1.

11. A coating prepared by the composition of claim 2.

12. A coating prepared by the composition of claim 6.

13. A coating prepared by the composition of claim 8.

* * * * *